(12) United States Patent
Filatov et al.

(10) Patent No.: US 8,868,924 B1
(45) Date of Patent: Oct. 21, 2014

(54) SYSTEM AND METHOD FOR MODIFYING A SOFTWARE DISTRIBUTION PACKAGE

(71) Applicant: Kaspersky Lab ZAO, Moscow (RU)

(72) Inventors: Konstantin M. Filatov, Moscow (RU); Victor V. Yablokov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/196,500

(22) Filed: Mar. 4, 2014

(51) Int. Cl.
| G06F 9/44 | (2006.01) |
| G06F 9/445 | (2006.01) |
| H04L 9/32 | (2006.01) |
| G06F 11/30 | (2006.01) |
| G06F 12/14 | (2006.01) |

(52) U.S. Cl.
CPC .................................... G06F 8/65 (2013.01)
USPC ........... 713/187; 717/111; 717/174; 717/177; 717/110; 713/176

(58) Field of Classification Search
None
See application file for complete search history.

(56) References Cited

U.S. PATENT DOCUMENTS

| 6,879,988 | B2 * | 4/2005 | Basin et al. ........................... 1/1 |
| 8,356,295 | B2 * | 1/2013 | Yaldwyn et al. .............. 717/175 |
| 8,464,249 | B1 | 6/2013 | Goldman et al. |
| 2005/0188203 | A1 * | 8/2005 | Bhaskaran et al. ........... 713/176 |
| 2006/0064488 | A1 | 3/2006 | Ebert |
| 2012/0284704 | A1 * | 11/2012 | Friedman et al. ............. 717/177 |
| 2014/0007082 | A1 * | 1/2014 | Berg et al. ..................... 717/177 |

* cited by examiner

*Primary Examiner* — Lewis A Bullock, Jr.
*Assistant Examiner* — Mark Gooray
(74) *Attorney, Agent, or Firm* — Arent Fox LLP; Michael Fainberg

(57) ABSTRACT

Disclosed are systems, methods and computer program products for modifying a software distribution package. In one aspect, the system receives a software distribution package including one or more compressed files and one or more digital signatures of the one or more files; determines whether it is necessary to modify the software distribution package; determines a size of modifications to the software distribution package; if the size of the modifications does not exceed a size threshold, modifies a commentary section of the software distribution package without recalculating of the digital signatures for the files included in the software distribution package; and if the size of the modifications exceeds the size threshold, modifies an offset region between a file structure of the software distribution package and the compressed files of the software distribution package without recalculating the digital signatures of the files included in the software distribution package.

15 Claims, 4 Drawing Sheets

SYSTEM AND METHOD FOR MODIFYING A SOFTWARE DISTRIBUTION PACKAGE

CROSS-REFERENCE TO RELATED APPLICATIONS

This application claims benefit of priority under 35 U.S.C. 119(a)-(d) to a Russian Application No. 2013153764 filed on Dec. 5, 2013, which is incorporated by reference herein.

TECHNICAL FIELD

The disclosure relates generally to the field of software, and more specifically, to a system and method for modifying a software distribution package.

BACKGROUND

Mobile operating systems are becoming increasingly popular. Software for mobile operating systems is being developed at a headlong pace. Software updates are issued regularly, the developers correct mistakes and issue updated versions with new functionality. Often, software distribution packages are archives with ARK extension, which contain application files, the digital signatures for the files, and a certificate that the files have been signed with Installation of these packages may be done either by the standard installer of the operating system or by other applications. For example, an antivirus application may install applications from ARK archive files. The digital signatures may be used to ensure security of the installation. The certificates may be used to verify the software suppliers. Files in a software distribution package that do not have a digital signature, have an incorrect signature, or have a signature by a certificate different from the certificate of a known service (for example, Google Play service), may be ignored by the installer application, or the user may be issued a warning.

In the delivery for an end user it is often necessary to somehow include supplemental parameters and settings along with the software distribution package being provided. This makes it possible to perform the installation of the software without the participation of the user, for example. Moreover, at the installation stage it may be possible to make modifications in the configuration of already installed software, modify the number of functional modules, transmit separate parameters for specific modules, and so on.

An analysis of the related art and the possibilities for making modifications in software being provided leads to the conclusion that the software distribution packages being provided for the mobile operating systems (e.g., Android operating system) at present do not have the ability to add supplemental parameters for a specific user. The altered parameters are introduced inside the software distribution package, which requires a recalculation of the signatures for the files inside the software distribution package.

SUMMARY

One of the technical result of the present invention is a simplification of the procedure of preparing a software distribution package for a specific user by making modifications in the software distribution package without a recalculating of the digital signatures for the files within the software distribution package.

According to an aspect, a method for modifying a software distribution package includes: receiving, by a processor, a software distribution package including one or more files and one or more digital signatures of the one or more files; determining whether it is necessary to modify the software distribution package; determining a size of modifications to the software distribution package; if the size of the modifications does not exceed a size threshold, modifying a commentary section of the software distribution package without recalculating the digital signatures for the files included in the software distribution package; and if the size of the modifications exceeds the size threshold, modifying an offset region between a file structure of the software distribution package and the files of the software distribution package without recalculating the digital signatures of the files included in the software distribution package.

According to another aspect, a system for modifying a software distribution package includes a processor configured to receive a software distribution package including one or more compressed files and one or more digital signatures of the one or more files; determine whether it is necessary to modify the software distribution package; determine a size of modifications to the software distribution package; if the size of the modifications does not exceed a size threshold, modify a commentary section of the software distribution package without recalculating of the digital signatures for the files included in the software distribution package; and if the size of the modifications exceeds the size threshold, modify an offset region between a file structure of the software distribution package and the compressed files of the software distribution package without recalculating the digital signatures of the flies included in the software distribution package.

According to yet another aspect, a computer program product, stored on a non-transitory computer readable medium, for modifying a software distribution package, includes computer executable instructions for receiving a software distribution package including one or more compressed files and one or more digital signatures of the one or more files; determining whether it is necessary to modify the software distribution package; determining a size of modifications to the software distribution package; if the size of the modifications does not exceed a size threshold, modifying a commentary section of the software distribution package without recalculating of the digital signatures for the files included in the software distribution package; and if the size of the modifications exceeds the size threshold, modifying an offset region between a file structure of the software distribution package and the compressed files of the software distribution package without recalculating the digital signatures of the files included in the software distribution package.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects are described herein in the context of a system, method and computer program product for modifying a software distribution package. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
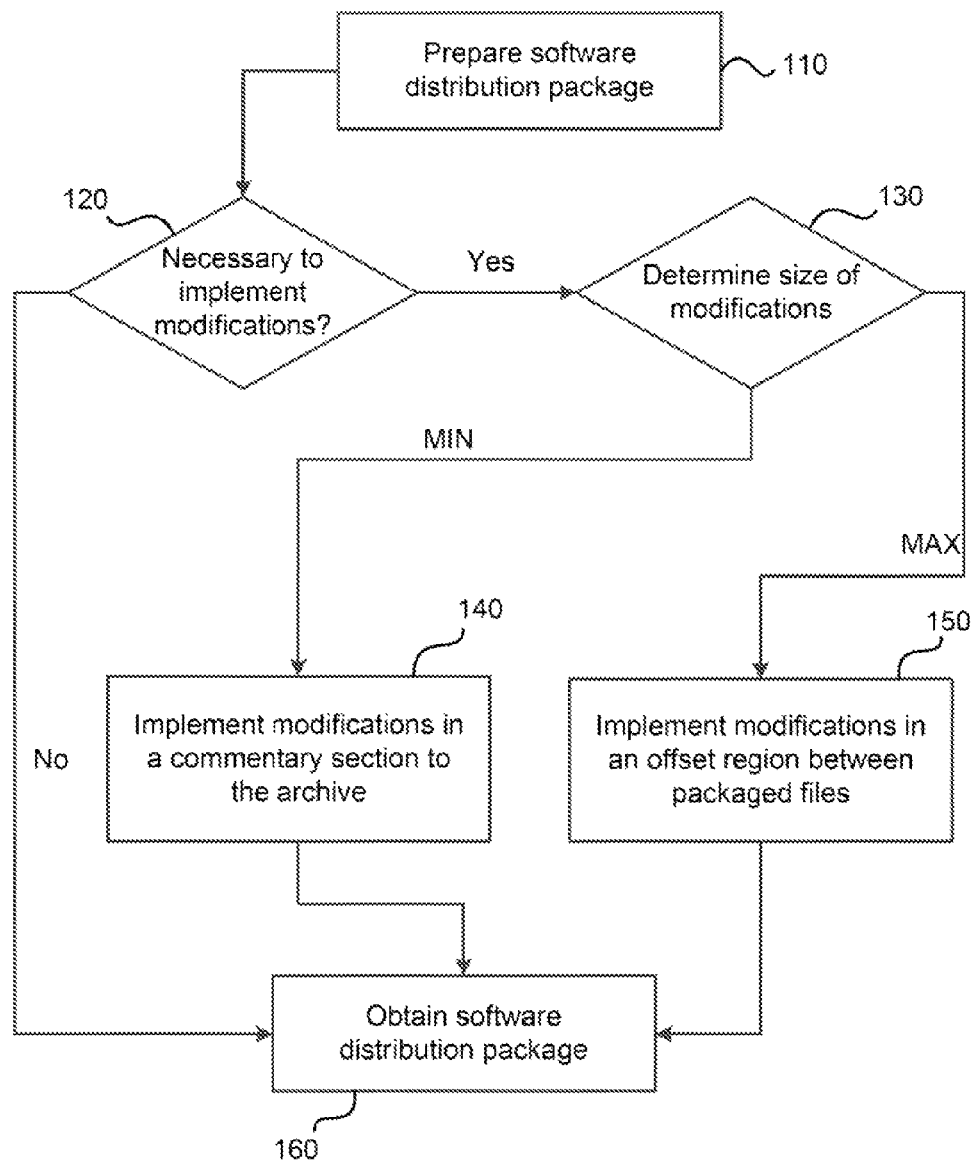
FIG. 1 illustrates a flow diagram of an example method for modifying a software distribution package according to aspects of the present invention.

FIG. 1 illustrates a flow diagram of an example method for modifying a software distribution package according to aspects of the present invention. In particular, FIG. 1 shows a sequence of adding supplemental parameters to a software distribution package for a specific user. The software distribution packages for a mobile operating system (e.g., Android operating system (OS)) may be provided, for example, in the form of archive executable (ARK) files. Each application may be compiled and packed in a single file, which includes the entire code of the application (DEX files), resources, and the .manifest. file. Files of ARK format may not be encrypted, they may be a subset of the ZIP archive format. Each ARK file may be a compressed archive for execution by a virtual machine (such as DalvikVM), which may be installed on different operating systems.

Each ARK file may include:
MANIFEST.MF—an information file as to the files in the archive (check sums);
CERT.RSA—a certificate that signs the application;
CERT.SF—an information file as to the resources and the certificate, such as:
Signature-Version; 1.0
Created-By: 1.0 (Android SignApk)
SHA1-Digest-Manifest: GgwBrUD9W9Ks6xdxVkulGcd0fvl=
Name: res/drawable-mdpi/ic_launcher_wallpaper.png
SHA1-Digest: Nv4FpS5EVW/+OTcQuljTkkdac8E=
Name: res/drawable/magicsmoke_thumb.png
SHA1-Digest: hUo+MNJ/0E+HApS3hBmGfSZMzyU=
Name: res/raw/clouds.bc
SHA1-Digest: JHNc9/DOuyBN29Sy5sQT+2Dt8ao=

The preparation of a software distribution package for the mobile operating system may consist of several steps. At first, the assembly tool may generate the ARK file. The assembly tool may be a utility (application) consisting of a set of development tools for the mobile operating system (e.g., Android SDK—Android Software Development Kit), which compiles project files and packages the results in an ARK file. Next, a signature tool may process the ARK file, preserving in this file the SHA1 sums of all the files inside the archive and the certificate with which the sums were generated. The signature tool may be a utility (application) from a development kit, such as the Java Development Kit (JDK), for example. After this, an aligning of the resulting archive may be performed (for example, with the "zipalign" utility). The alignment procedure may usually arrange the compressed data of the files inside the archive so as to ensure maximum speed during the extraction of the files from the archive. As a result, a software distribution package, e.g., a signed ARK file, may be generated.

As shown in FIG. 1, at step 110, the process may prepare a software distribution package. At step 120, it may be determined whether it is necessary to modify the software distribution package for a specific user. If it is necessary to modify the package for a specific user, the set of these modifications may be determined in step 130. For example, modifications may include rules for parental control components of an antivirus application. Parental Control is a set of rules and steps configured to prevent negative effects of the Internet and the computer on a person being sheltered, usually a child. Modifications may also include rules as to the scan status of the archive by an antivirus application, or settings of the file categories used by the components of the antivirus application that provide for the program control (Application Control). Application Control is a security technique of an antivirus application that may use a database of trusted applications (whitelisting) including full and up to date information on the majority of existing legitimate applications. Application Control may make it possible to perform Default Deny scenarios, wherein users can only launch verified and authorized programs.

The files MANIFEST.MF and CERT.SF may be created during the signature procedure of the ARK file, thus, after the signature it may no longer be possible to add another file within the ARK file that will include settings for a specific user, for example. After this, the size of the required modifications (settings for a particular user) may be determined in step 130. If the size does not exceed a given threshold, the modifications may be made (140) in the commentary section to the archive (ARK files are a subset of the ZIP format, the ZIP format has a corresponding section). But if the size of the modifications being made exceeds the threshold, they may be placed inside the ARK file in the data region between the packaged files (150).

The resulting ARK file (160) may now include settings for the particular user and may be provided to this user.

The following is an example aspect of the invention. The software distribution package may include the following files:
META-INF\CERT.RSA
META-INF\CERT.SF
META-INF\MANIFEST.SF
RES\image.png
Android Manifest.xml
classes.dex
resources.arsc In order to add supplemental settings, it may be necessary to include in the software distribution package yet another file, such as SETTINGS\params.dat. This file may be either a text or a binary file. After adding the file, it may be necessary to recalculate the signatures for the files inside the software distribution package. The signature tool may calculate the signatures for all files included in the software distribution package, but not for individual files. Upon modifying parameters (the settings for a different user may be different from the current ones), it may be necessary to make modifications to the file params.dat, which again may require recalculating the digital signatures for the files inside the software distribution package. When using the present invention, data may be introduced into the commentary section of the ARK file or in the regions between compressed data inside the software distribution package, which does not modify the file structure of the software distribution package and does not require recalculating the digital signatures for the files included in the software distribution package.

Figure 2:
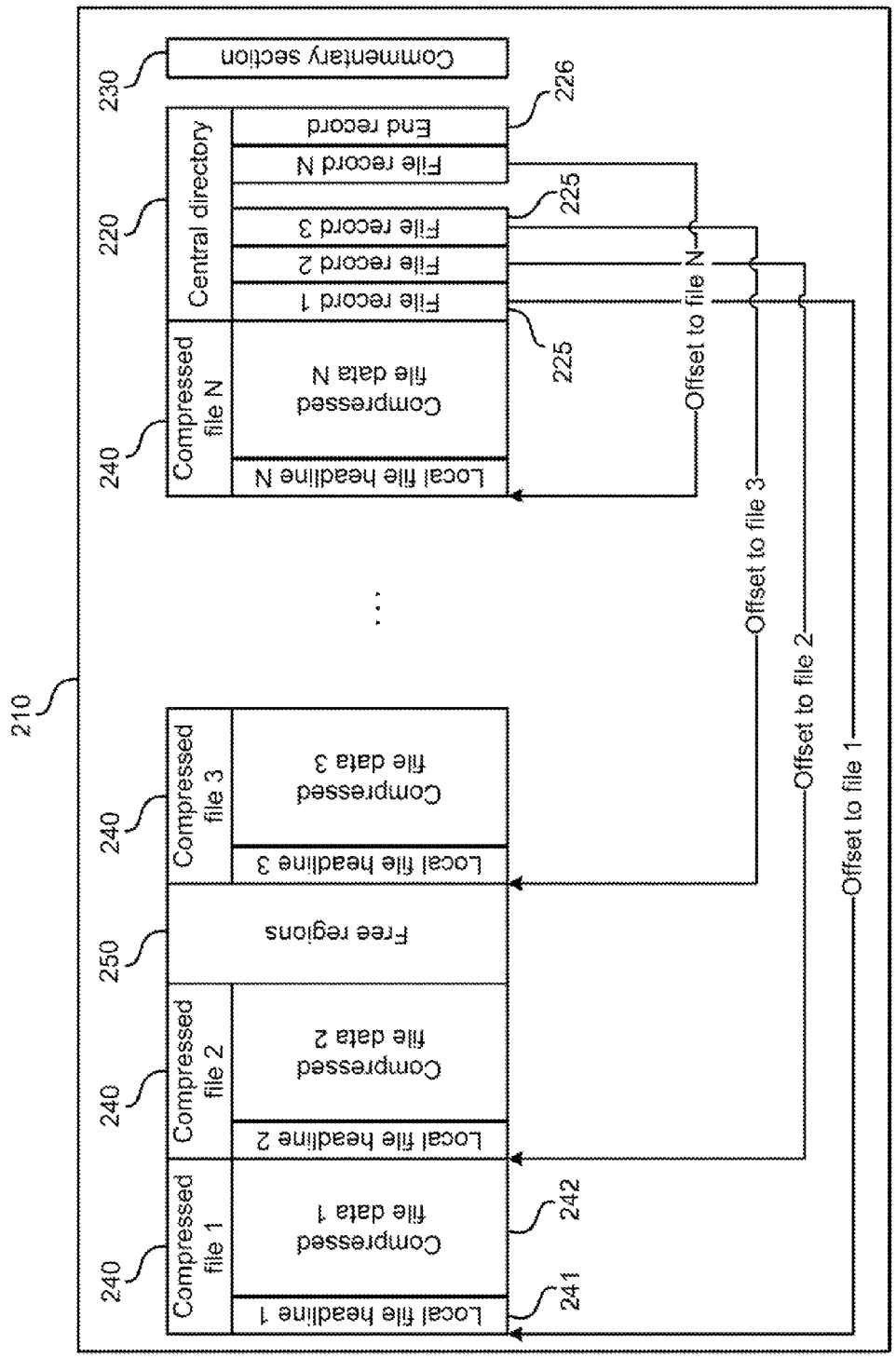
FIG. 2 illustrates a block diagram of an example method of adding supplemental data to a file of the software distribution package according to aspects of the present invention.

FIG. 2 illustrates a diagram of an example method of adding supplemental data to a file of a software distribution package according to aspects of the present invention. Each ZIP archive 210 (and, consequently, the ARK file) may include a so-called "central directory" 220, which comes at the end of the archive, making it possible to add new files to the archive. This directory may include a list of file records 225 (names of the files and directories) included in the archive, as well as headlines about the records. Each headline in the central directory may include:

the size after compression;
the size before compression;
the length of the filename;
the size of the supplemental data on the file;
the size of the commentary to the file;
the disk number at which the file starts;
the relative offset to the local file header the number of bytes from the start of the disk on which the file starts, to the local header for the file);
the filename;
supplemental data about the file;
commentary for the file.

The central directory may end with an end record 226 (EOCD record), which includes:

the number of the current disk;
the number of the disk from which the central directory starts;
the number of records in the central directory on this disk;
the total number of records in the central directory;
the size of the central directory;
the offset to the central directory with respect to the start of the archive;
the size of the commentary;
the commentary.

Thus, after reading and analyzing the central directory, one may obtain access directly to the compressed data of any record 240 (to the compressed files) included in the central directory, by the offset described in the headline.

These records also start from a local file headline 241. The local file headline may include information about what is included in the central directory, namely:

the size after compression;
the size before compression;
the length of the filename;
the size of the supplemental data on the file;
the filename;
the supplemental data on the file.

Compressed file data 242 may begin immediately after the headline.

The data of the records inside the archive may be kept in an order different from its sequence inside the central directory. The presence of a file in the archive may in fact be determined by the information on the file in the central directory (if three files A, B and C have been packaged in the archive, then in order to remove file B from the archive it may be enough to remove its record from the central directory, without removing the data of file B from the archive itself). Thus, by modifying the offset inside the central directory and offsetting the data of the file and the headlines inside the data section of the archive, one may identify free regions 250 that will be situated inside the archive and will not be limited in size. Any data can be written into these free regions, including information about settings for a particular user. For example, when installing additional modules delivered in ARK files, the antivirus application may analyze the correspondence of the records in the central directory with the headlines of the files in the data section of the archive, and if regions are found that are located between the compressed data of one file and the headline of another file it may use the data read out from them as supplemental parameters during the installation.

The calculation of the offset within the central directory, the offsetting of the data within the archive, and the creation of the resulting ARK file may be done, for example, on a general-purpose computer system, such as one shown in FIG. 4 below.

Figure 3:
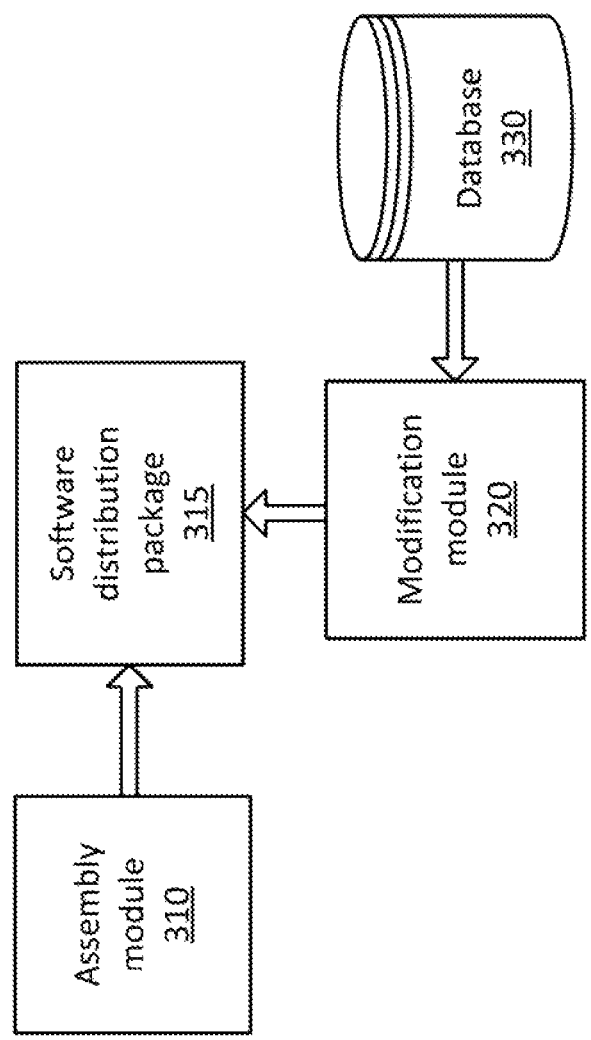
FIG. 3 illustrates a block diagram of an example system for modifying a software distribution package according to aspects of the present invention.

FIG. 3 illustrates a block diagram of an example system for modifying a software distribution package according to aspects of the present invention. The assembly module 310 may prepare the software distribution package 315. The modification module 320 may determine if it is necessary to make modifications to the software distribution package 315 for example, special settings of applications for a particular user). If modifications are required, the modification module 320 may obtain a set of parameters from database 330. The data in the database 330 may be modified by the administrator when setting up the applications for a particular user. The modifications module 320 may then determine whether or not the size of the modifications exceeds a size threshold. If the modifications module 320 determines that the size of the modifications does not exceed a size threshold, the modifications module 320 may modify a commentary section of the software distribution package without recalculating of the digital signatures for the files included in the software distribution package 315. If the modifications module 320 determines that the size of the modifications exceeds the size threshold, the modifications module 320 may modify an offset region between the file structure of the software distribution package and the compressed files in the software distribution package without recalculating the digital signatures for the files included in the software distribution package 315.

Figure 4:
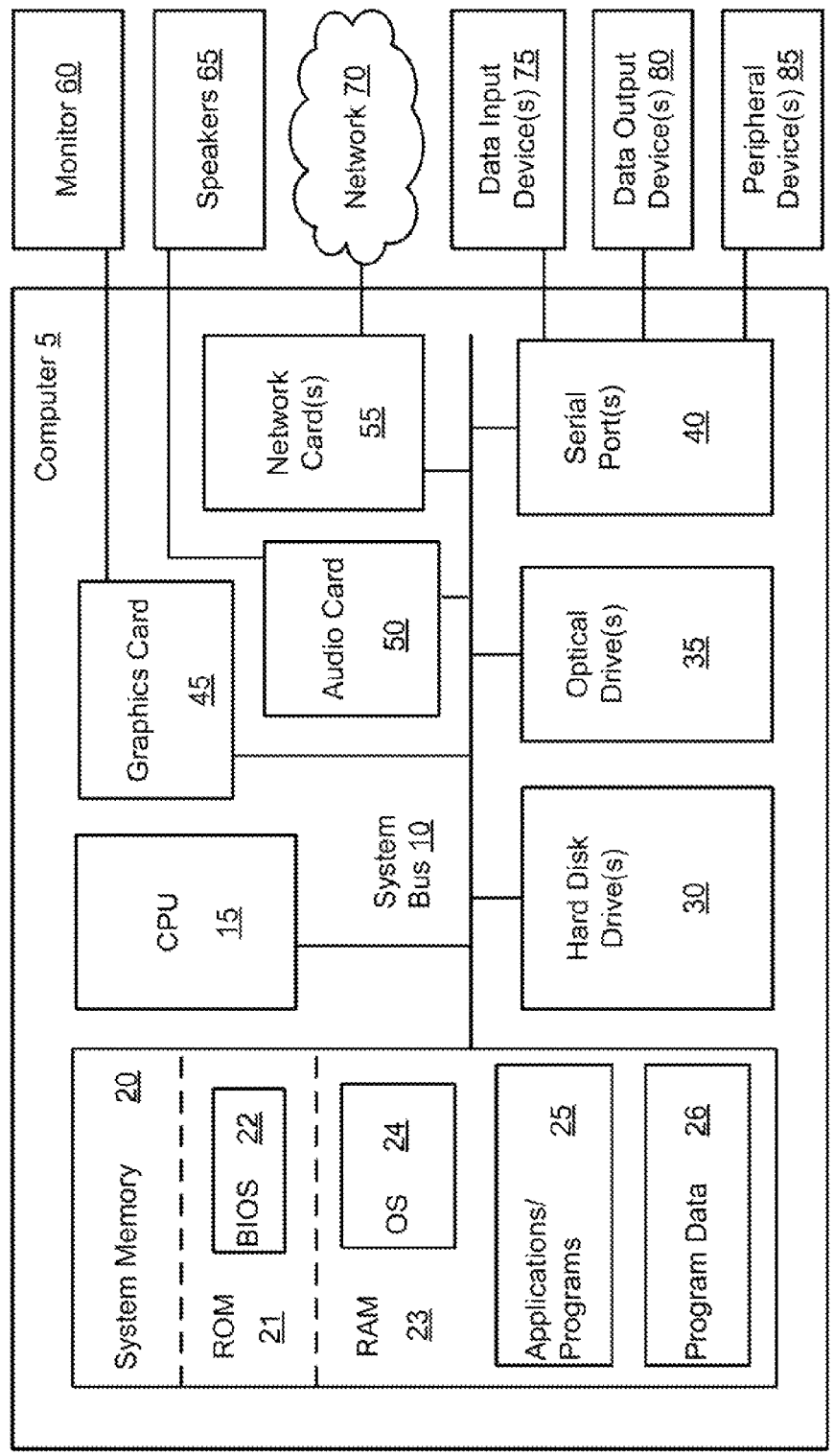
FIG. 4 illustrates a block diagram of an example general-purpose computer system on which the system and method for modifying a software distribution package may be implemented according to aspects of the present invention.

FIG. 4 illustrates a block diagram of an example general-purpose computer system 5 that may be used to implement the disclosed systems and methods for modifying a software distribution package. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port (s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), including the basic routines that help to transfer information between the modules of computer system 5, such as during start-up. RAM 23 stores operating system 24 (OS), such as Windows 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 4 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for modifying a software distribution package, the method comprising:
  receiving, by a processor, a software distribution package including one or more files and one or more digital signatures of the one or more files;
  wherein the one or more files are compressed;
  determining whether it is necessary to modify the software distribution package;
  determining a size of modifications to the software distribution package;
  if the size of the modifications does not exceed a size threshold, modifying a commentary section of the software distribution package to add the modifications without recalculating the digital signatures for the files included in the software, distribution package; and
  if the size of the modifications exceeds the size threshold, modifying an offset region between a file structure of the software distribution package and the files of the software distribution package to identify free regions; adding the modification to the free regions without recalculating the digital signatures of the files included in the software distribution package.

2. The method of claim 1, wherein the modifications include adding to the distributed software package parental control rules of an antivirus application.

3. The method of claim 1, wherein the modifications include adding to the software distribution package rules as to the status of scanning of the software distribution package by an antivirus application.

4. The method of claim 1, wherein the modifications, include the settings for file categories used by an antivirus application to perform antivirus scanning of the flies.

5. The method of claim 1, wherein the threshold value has a size of 65535 bytes.

6. A system for modifying a software distribution package, the system comprising:
 a processor configured to:
 receive a software distribution package including one or more compressed files and one or more digital signatures of the one or more files;
 determine whether it is necessary to modify the software distribution package;
 determine a size of modifications to the software distribution package;
 if the size of the modifications does not exceed a size threshold, modify a commentary section of the software distribution package to add the modifications without recalculating of the digital signatures for the flies included in the software distribution package; and
 if the size of the modifications exceeds the size threshold, modify an offset region between a file structure of the software distribution package and the compressed flies of the software distribution package to identify free regions;
 adding the modification to the free regions without recalculating the digital signatures of the flies included in the software distribution package.

7. The system of claim 6, wherein the modifications include parental control rules of an antivirus application.

8. The system of claim 6, wherein the modifications include rules as to the status of scanning of the software distribution package by an antivirus application.

9. The system of claim 6, wherein the modifications include the settings for file categories used by an antivirus application to perform antivirus scanning of the files.

10. The system of claim 6, wherein the threshold value has a size of 65535 bytes.

11. A computer program product, stored on a non-transitory computer readable medium, for modifying a software distribution package, wherein the computer program product includes computer executable instructions for:
 receiving a software distribution package including one or more compressed files and one or more digital signatures of the one or more files;
 determining whether it is necessary to modify the software distribution package;
 determining a size of modifications to the software distribution package;
 if the size of the modifications does not exceed a size threshold, modifying a commentary section of the software distribution package to add the modifications without recalculating of the digital signatures for the flies included in the software distribution package; and
 if the size of the modifications exceeds the size threshold, modifying an offset region between a file structure of the software distribution package and the compressed files of the software distribution package to identify free regions;
 adding the modification to the free regions without recalculating the digital signatures of the files included in the software distribution package.

12. The product of claim 11, wherein the modifications include parental control rules of an antivirus application for the files included in the software distribution package.

13. The product of claim 11, wherein the modifications include rules indicating the status of antivirus scan of the software distribution package by an antivirus application.

14. The product of claim 11, wherein the modifications include settings for file categories used by an antivirus application to perform antivirus scan of the files.

15. The product of claim 11, wherein the threshold value has a size of 65535 bytes.

\* \* \* \* \*